US011246116B2

(12) United States Patent
Zeng et al.

(10) Patent No.: US 11,246,116 B2
(45) Date of Patent: Feb. 8, 2022

(54) MULTIPLE MCS TABLES FOR NR

(71) Applicant: QUALCOMM Incorporated, San Diego, CA (US)

(72) Inventors: Weiliang Zeng, San Diego, CA (US); Taesang Yoo, San Diego, CA (US); Seyed Ali Akbar Fakoorian, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 15/997,349

(22) Filed: Jun. 4, 2018

(65) Prior Publication Data

US 2018/0368108 A1 Dec. 20, 2018

Related U.S. Application Data

(60) Provisional application No. 62/521,045, filed on Jun. 16, 2017.

(51) Int. Cl.
*H04W 72/04* (2009.01)
*H04L 1/00* (2006.01)

(52) U.S. Cl.
CPC .......... *H04W 72/04* (2013.01); *H04L 1/0003* (2013.01); *H04L 1/0009* (2013.01); *H04L 1/0016* (2013.01); *H04L 1/0025* (2013.01)

(58) Field of Classification Search
None
See application file for complete search history.

(56) References Cited

U.S. PATENT DOCUMENTS

2009/0010211 A1* 1/2009 Sumasu ............... H04L 1/0003
370/329
2014/0192732 A1 7/2014 Chen et al.
(Continued)

FOREIGN PATENT DOCUMENTS

| CN | 101112111 A | 1/2008 |
| CN | 101636952 A | 1/2010 |

(Continued)

OTHER PUBLICATIONS

International Search Report and Written Opinion—PCT/US2018/035963—ISA/EPO—dated Sep. 17, 2018.
(Continued)

*Primary Examiner* — Yaotang Wang
(74) *Attorney, Agent, or Firm* — Norton Rose Fullbright US

(57) ABSTRACT

Multiple modulation and coding scheme (MCS) tables for new radio (NR) networks is disclosed. Multiple MCS tables are defined with different sets of MCS values selected for improved performance in various transmission conditions. The multiple MCS tables may be known to base stations and user equipments (UEs) in the network. A serving base station may determine a set of transmission characteristics related to a transmission environment of a UE. The base station selects one of the MCS tables of the multiple MCS tables based on the set of transmission characteristics. The selected MCS table includes MCS values that may provide improved performance for the UE considering one or more of the characteristics of the set of transmission characteristics. The base station will then transmit an indication of the selected MCS table to the served UE.

24 Claims, 8 Drawing Sheets

(56) References Cited

U.S. PATENT DOCUMENTS

| | | | |
|---|---|---|---|
| 2015/0036590 A1 | 2/2015 | Lahetkangas et al. | |
| 2015/0195818 A1 | 7/2015 | Davydov et al. | |
| 2015/0381310 A1* | 12/2015 | Hammarwall | H04L 1/0016 370/329 |
| 2018/0159707 A1* | 6/2018 | Onggosanusi | H04L 1/0026 |

FOREIGN PATENT DOCUMENTS

| | | |
|---|---|---|
| CN | 104202115 A | 12/2014 |
| CN | 105164961 A | 12/2015 |
| CN | 105453468 A | 3/2016 |
| EP | 1845742 A1 | 10/2007 |
| EP | 2787670 A1 | 10/2014 |
| WO | WO-2008093945 A2 | 8/2008 |

OTHER PUBLICATIONS

Huawei, et at., "MCS Table for UL 256QAM," 3GPP TSG RAN WG1 Meeting #85, R1-164092, Nanjing, China, May 23-27, 2016, (May 13, 2016), 5 pages.

\* cited by examiner

MULTIPLE MCS TABLES FOR NR

CROSS-REFERENCE TO RELATED APPLICATIONS

This application claims the benefit of U.S. Provisional Patent Application No. 62/521,045, entitled, "MULTIPLE MCS TABLES FOR NR," filed on Jun. 16, 2017, which is expressly incorporated by reference herein in its entirety.

BACKGROUND

Field

Aspects of the present disclosure relate generally to wireless communication systems, and more particularly, to multiple modulation and coding scheme (MCS) tables for new radio (NR) networks.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes determining, by a base station, a set of transmission characteristics related to a transmission environment of a served UE, selecting, by the base station, a modulation and coding scheme (MCS) table from a plurality of MCS tables based on the set of transmission characteristics, wherein each of the plurality of MCS tables includes a set of MCS values selected for improved performance with transmission conditions associated with one or more characteristics of the set of transmission characteristics, and transmitting an indication of the selected MCS table to the served UE by the base station.

In an additional aspect of the disclosure, an apparatus configured for wireless communication includes means for determining, by a base station, a set of transmission characteristics related to a transmission environment of a served UE, selecting, by the base station, a MCS table from a plurality of MCS tables based on the set of transmission characteristics, wherein each of the plurality of MCS tables includes a set of MCS values selected for improved performance with transmission conditions associated with one or more characteristics of the set of transmission characteristics, and transmitting an indication of the selected MCS table to the served UE by the base station.

In an additional aspect of the disclosure, a non-transitory computer-readable medium having program code recorded thereon. The program code further includes code to determine, by a base station, a set of transmission characteristics related to a transmission environment of a served UE, code to select, by the base station, a MCS table from a plurality of MCS tables based on the set of transmission characteristics, wherein each of the plurality of MCS tables includes a set of MCS values selected for improved performance with transmission conditions associated with one or more characteristics of the set of transmission characteristics, and code to transmit an indication of the selected MCS table to the served UE by the base station.

In an additional aspect of the disclosure, an apparatus configured for wireless communication is disclosed. The apparatus includes at least one processor, and a memory coupled to the processor. The processor is configured to determine, by a base station, a set of transmission characteristics related to a transmission environment of a served UE, to select, by the base station, a MCS table from a plurality of MCS tables based on the set of transmission characteristics, wherein each of the plurality of MCS tables includes a set of MCS values selected for improved performance with transmission conditions associated with one or more characteristics of the set of transmission characteristics, and to transmit an indication of the selected MCS table to the served UE by the base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
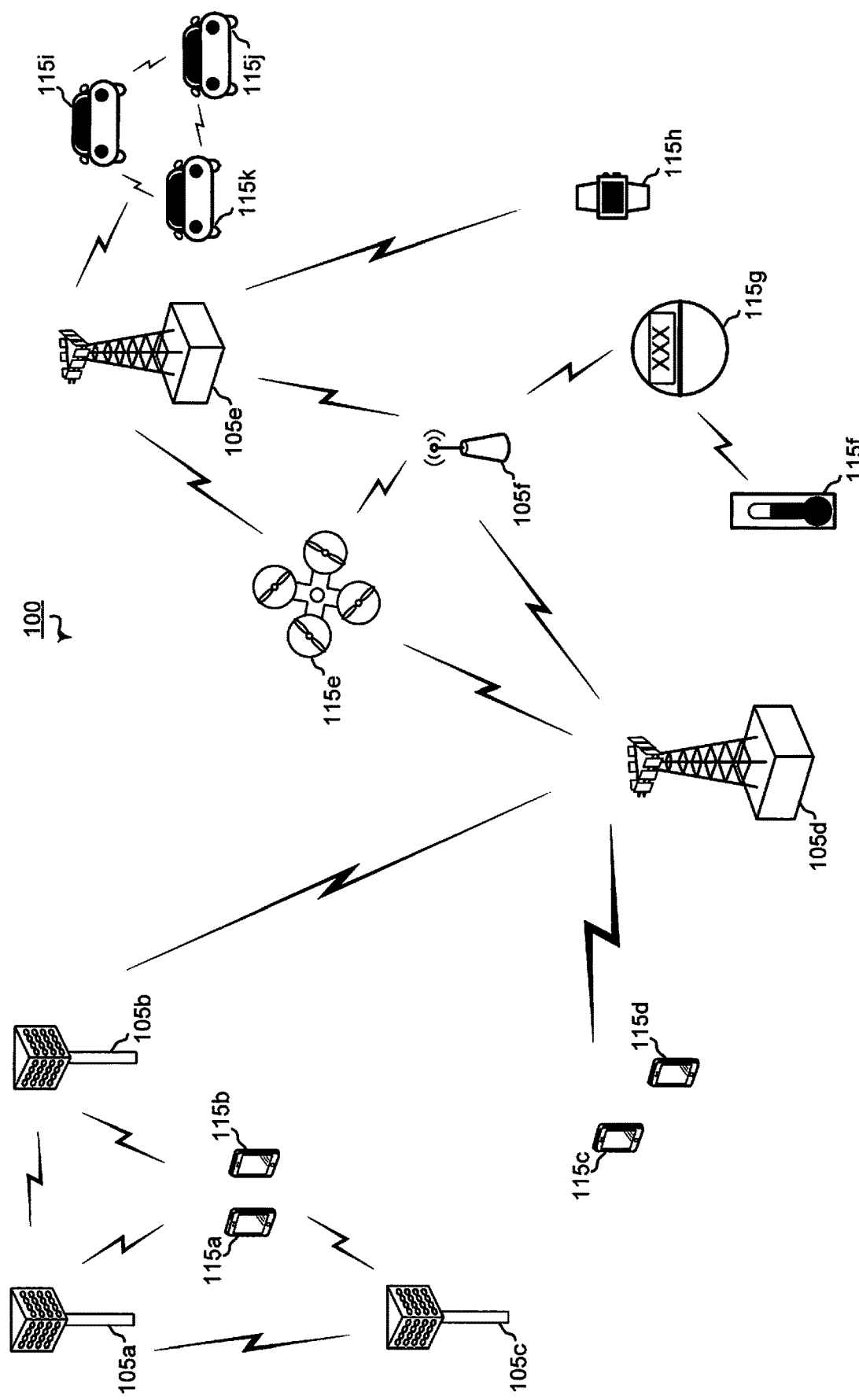
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eND (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pica cell or a femtocell, and/or other types of cell. A macro cell generally covers a relatively large geographic area (e.g., several kilometers in radius) and may allow unrestricted access by UEs with service subscriptions with the network provider. A small cell, such as a pica cell, would generally cover a relatively smaller geographic area and may allow unrestricted access by UEs with service subscriptions with the network provider. A small cell, such as a femto call, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell, may be referred to as a small cell base station, a pica base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
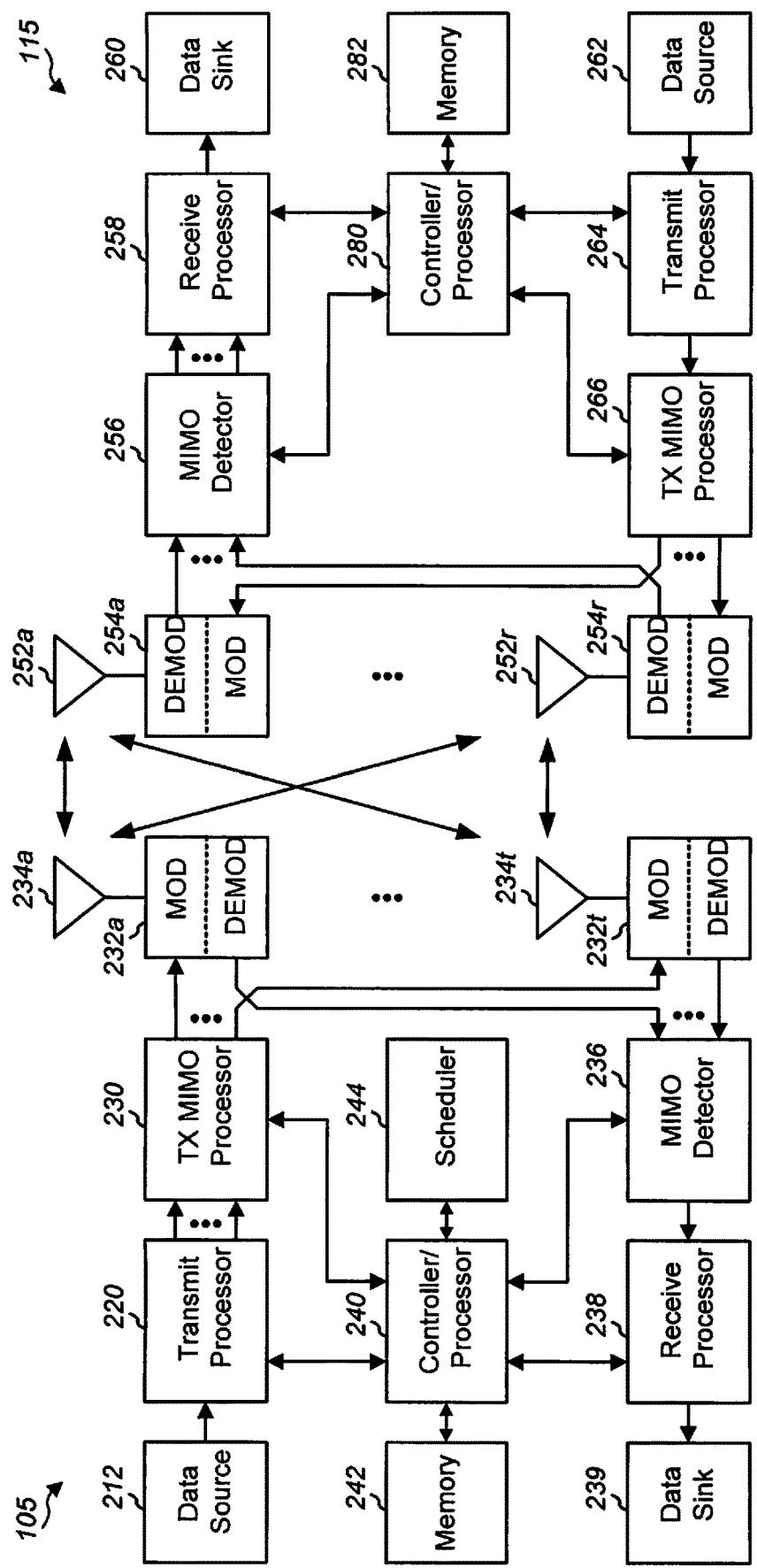
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 6, and/or other processes for the techniques described herein. The memories 242 and 282 may store data and program codes for the base station 105 and the UE 115, respectively. A scheduler 244 may schedule UEs for data transmission on the downlink and/or uplink.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 115g is illustrated communicating with UE 115f. In some examples, UE 115g is functioning as a scheduling entity or a primary sidelink device, and UE 115f may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 115i-k may optionally communicate directly with one another in addition to communicating with base station 105e.

Unicast or broadcast transmissions of control information and/or traffic information from a base station (e.g., base station 105a) to one or more UEs (e.g., UEs 115a and 115b) may be referred to as downlink (DL) transmission, while transmissions of control information and/or traffic information originating at a UE (e.g., UE 115c) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple subframes may be grouped together to form a single frame or radio frame. Of course, these definitions are not required, and any suitable scheme for organizing waveforms may be utilized, and various time divisions of the waveform may have any suitable duration.

Further, the air interface in 5G network 100 (FIG. 1) may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
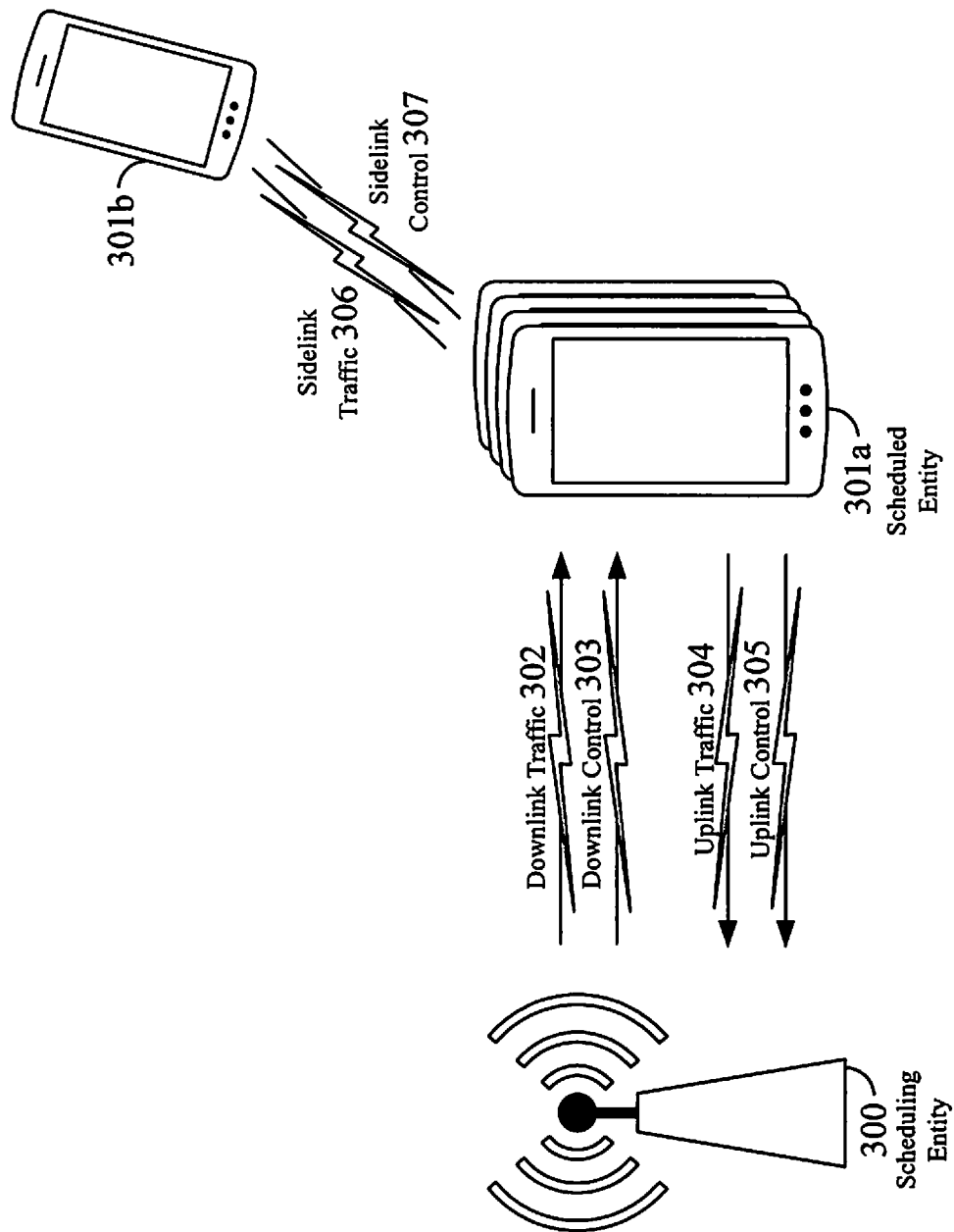
FIG. 3 is a block diagram illustrating an example of a hardware implementation for a scheduling entity employing a processing system according to some aspects of the disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 3, a block diagram illustrates a scheduling entity 300 and a plurality of scheduled entities 301 (e.g., 301*a* and 301*b*). Here, the scheduling entity 300 may correspond to a base station 105*x*. In additional examples, the scheduling entity 300 may correspond to a UE 115*a*, the quadcopter (UE 115*e*), or any other suitable node in the 5G network 100. Similarly, in various examples, the scheduled entity 301 may correspond to any of UEs 115*n*, or any other suitable node in 5G network 100 (FIG. 1), such as base station 105*x*. Thus, the scheduling entity 300 may include UEs, base stations, transmission/reception points (TRPs) and the like, while the scheduled entity 301 may also include UEs, base stations, TRPs, and the like. The distinction is made based on which entity seeks to perform the scheduling and which of the entities will be scheduled.

As illustrated in FIG. 3, the scheduling entity 300 may broadcast traffic 302 to one or more scheduled entities 301 (the traffic may be referred to as downlink traffic). In accordance with certain aspects of the present disclosure, the term downlink may refer to a point-to-multipoint transmission originating at the scheduling entity 300. Broadly, the scheduling entity 300 is a node or device responsible for scheduling traffic in a wireless communication network, including the downlink transmissions and, in some examples, uplink traffic 310 from one or more scheduled entities to the scheduling entity 300. Another way to describe the system may be to use the term broadcast channel multiplexing. In accordance with aspects of the present disclosure, the term uplink may refer to a point-to-point transmission originating at a scheduled entity 301. Broadly, the scheduled entity 301 is a node or device that receives scheduling control information, including but not limited to scheduling grants, synchronization or timing information, or other control information from another entity in the wireless communication network such as the scheduling entity 300.

The scheduling entity 300 may broadcast control information 303 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 301. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 304 and/or downlink traffic 302 including one or more traffic channels, such as a physical downlink shared channel (PDSCH) or a physical uplink shared channel (PUSCH) (and, in some examples, system information blocks (SIBs)), may additionally be transmitted between the scheduling entity 300 and the scheduled entity 301. Transmissions of the control and traffic information may be organized by subdividing a carrier, in time, into suitable transmission time intervals (TTIs).

Furthermore, the scheduled entities 301 may transmit uplink control information 305 including one or more uplink control channels to the scheduling entity 300. Uplink control information may include a variety of packet types and categories, including pilots, reference signals, and information configured to enable or assist in decoding uplink traffic transmissions. In some examples, the control information 305 may include a scheduling request (SR), i.e., request for the scheduling entity 300 to schedule uplink transmissions. Here, in response to the SR transmitted in the control information 305, the scheduling entity 300 may transmit downlink control information 303 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 300 and scheduled entities 301 may include suitable hardware and capabilities (e.g., an encoder and/or decoder) to utilize any one or more of these error correcting codes for wireless communication.

In some examples, scheduled entities such as a first scheduled entity 301*a* and a second scheduled entity 301*b* may utilize sidelink signals for direct D2D communication. Sidelink signals may include sidelink traffic 306 and sidelink control 307. Sidelink control information 307 may include a request-to-send (RTS) channel and a clear-to-send (CTS) channel. The RTS may provide for a scheduled entity 301 to request a duration of time to keep a sidelink channel available for a sidelink signal; and the CTS may provide for the scheduled entity 301 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 306.

The channels or carriers illustrated in FIG. 3 are not necessarily all of the channels or carriers that may be utilized between a scheduling entity 300 and scheduled entities 301, and those of ordinary skill in the art will recognize that other channels or carriers may be utilized in addition to those illustrated, such as other traffic, control, and feedback channels.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 4:
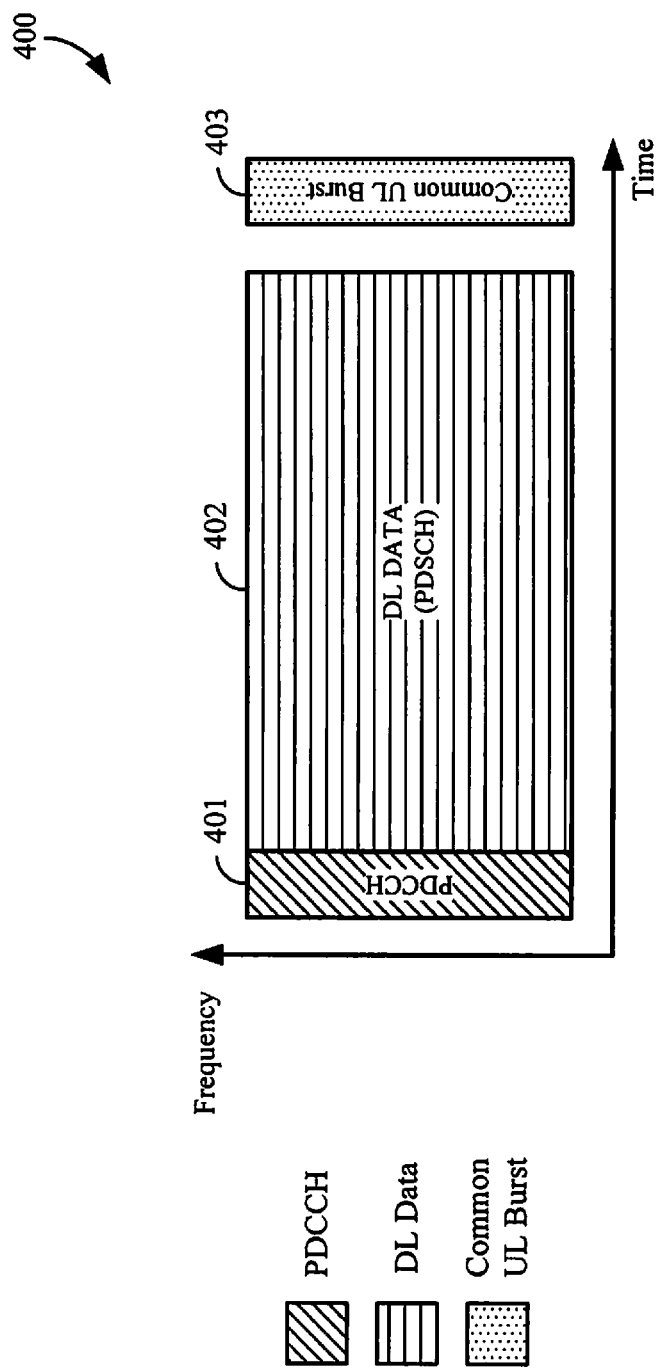
FIG. 4 is a diagram illustrating an example of a downlink centric slot according to some aspects of the disclosure.
Figure 5:
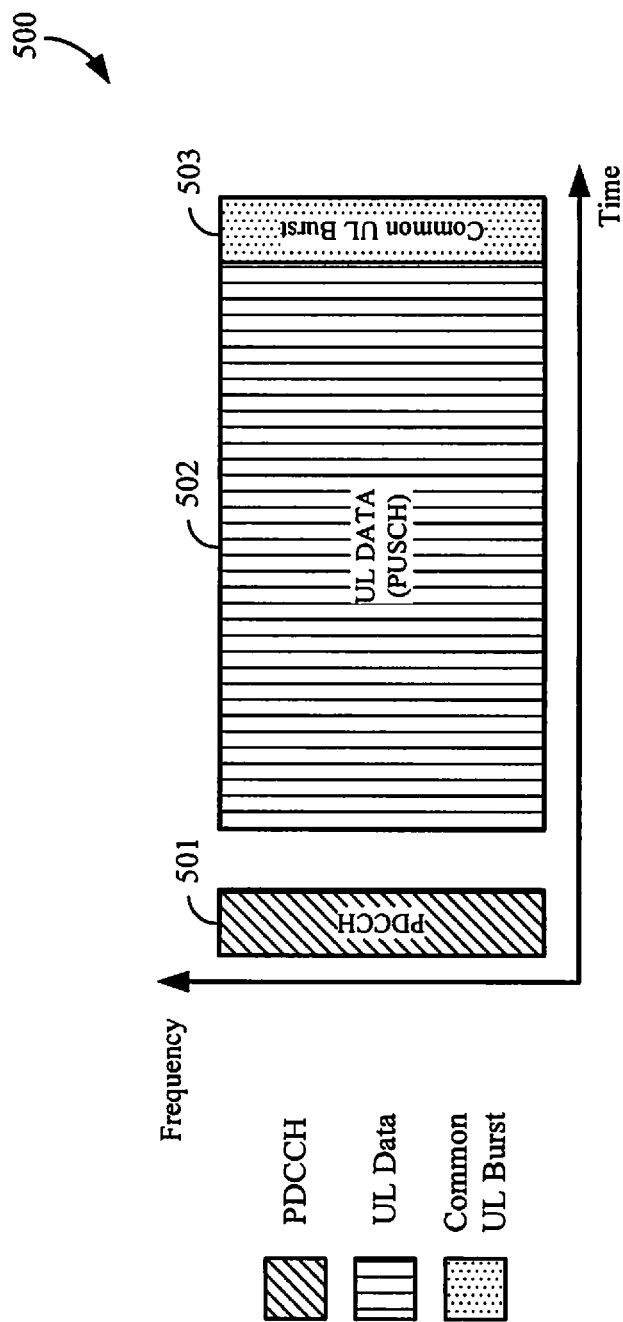
FIG. 5 is a diagram illustrating an example of an uplink centric slot according to some aspects of the disclosure.

FIGS. 4-5 are schematic diagrams that illustrate the structure of various slot formats according to a variety of aspects of this disclosure. As illustrated in FIG. 4, in each of these illustrations, the horizontal dimension represents time, and the vertical dimension represents frequency. Neither of these dimensions is intended to be accurate to scale, and are merely utilized as a scheme to illustrate characteristics of different waveforms over time as they may be configured in respective examples and embodiments. FIG. 4 is a diagram showing an example of a DL-centric slot 400. The DL-centric slot may include a control portion 401. The control portion 401 may exist in the initial or beginning portion of the DL-centric slot. The control portion 401 may include various scheduling information and/or control resources corresponding to various portions of the DL-centric slot. In some configurations, the control portion 401 may include a physical downlink control channel (PDCCH), as indicated in FIG. 4. The DL-centric slot may also include a downlink data portion 402. The downlink data portion 402 may sometimes be referred to as the payload of the DL-centric slot. The downlink data portion 402 may include the communication resources utilized to communicate downlink data from a scheduling entity 300 (e.g., eNB, gNB, base station) to a scheduled entity 301 (e.g., UE). In some configurations, the downlink data portion 402 may be a physical downlink shared channel (PDSCH).

The DL-centric slot may also include a common uplink burst 403. The common uplink burst 403 may sometimes be referred to as an uplink burst, a common uplink portion, and/or various other suitable terms. The common uplink burst 403 may include feedback information corresponding to various other portions of the DL-centric slot. For example, the common uplink burst 403 may include feedback information corresponding to the control portion 401. Non-limiting examples of feedback information may include an ACK signal, a NACK signal, a HARQ indicator, and/or various other suitable types of information. The common uplink burst 403 may include additional or alternative information, such as information pertaining to random access channel (RACH) procedures, scheduling requests (SRs), and various other suitable types of information. As illustrated in FIG. 4, the end of the downlink data portion 402 may be separated in time from the beginning of the common uplink burst 403. This time separation may sometimes be referred to as a gap, a guard period, a guard interval, and/or various other suitable terms. This separation provides time for the switch-over from downlink communication (e.g., reception operation by the scheduled entity 301 (e.g., UE)) to uplink communication (e.g., transmission by the scheduled entity 300 (e.g., UE)). One of ordinary skill in the art will understand that the foregoing is merely one example of a DL-centric subframe and alternative structures having similar features may exist without necessarily deviating from the aspects described herein.

FIG. 5 is a diagram showing an example of an UL-centric slot 600. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an uplink data portion 604. The uplink data portion 604 may sometimes be referred to as the payload of the UL-centric slot. The uplink portion may refer to the communication resources utilized to communicate uplink data from the scheduled entity 204 (e.g., UE) to the scheduling entity 202 (e.g., eNB, gNB, base station). In some configurations, the control portion 602 may be a physical uplink shared channel (PUSCH).

As illustrated in FIG. 5, the end of the control portion 501 may be separated in time from the beginning of the uplink data portion 502. This time separation may sometimes be referred to as a gap, guard period, guard interval, and/or various other suitable terms. This separation provides time for the switch-over from downlink communication (e.g., reception operation by the scheduling entity 300 (e.g., UE)) to uplink communication (e.g., transmission by the scheduling entity 300 (e.g., UE)). The UL-centric slot may also include a common uplink burst 503. The common uplink burst 503 in FIG. 5 may be similar to the common uplink burst 403 described above with reference to FIG. 4. The common uplink burst 403 may include additional or alternative information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

The attributes of data transmission in NR networks can be significantly different than data transmissions in LTE networks. For example, the codeword-to-layer mapping rules for NR is different from that of LTE. NR allows up to four layers per codeword, while LTE allows up to two layers per codeword. For transmission scenarios with more than four layers, NR allows two codewords, each with up to four layers. Because different layers may experience different channel quality, allowing the different number of layers per codeword may affect how the modulation and coding scheme (MCS) table should be constructed for the optimal link adaptation. The MCS table provides the available choices of code rate and modulation order pairs.

In the case of transmissions from multiple transmission/reception points (TRPs) and multiple panels, the layers belonging to a single NR codeword may, in fact, come from different, multiple TRPs or panels. In such case, the layers belonging to a codeword that are transmitted from different TRPs/panels may experience a larger variation in channel quality, which, again, may affect the optimal choice of code rate-modulation order pairs. NR supports both codebook-based and non-codebook-based multiple input, multiple output (MIMO) transmissions. Depending on the precoding scheme employed by the gNB, the layers belonging to a codeword may experience a larger or a smaller variation in channel quality, which, again, affects the optimal choice of code rates and modulation order. Thus, there are many different operational aspects to NR transmissions that may affect how the modulation order-code rate pairs should be chosen.

Various standards discussions have suggested possible support in NR networks for 3- and 4-layer transmissions, with a 1-codeword per PDSCH/PUSCH assignment per UE. Demodulation reference signal (DMRS) port groups belonging to one codeword can have different quasi-co-location (QCL) assumptions in NR. One uplink- or downlink-related downlink control information (DCI) in NR may include one MCS and one channel quality indicator (CQI) calculated per codeword.

For transmissions using more than four layers, NR networks may support mapping of the two codewords to at most four layers each. In such scenarios, the L>4 layer transmission may be split with the first L/2 layers mapped to the first codeword (codeword0) and the remaining layers mapped to the second codeword (codeword1). Configuration of the codeword mapping is performed by the serving gNB and sent to the UE. Such signaling may be provided semi-statically, such as via radio resource control (RRC) signaling or medium access control (MAC) control element (MAC-CE), or dynamically, such as through DCI signaling, or both.

For NR reception, a single NR-PDCCH may schedule a single NR-PDSCH where separate layers are transmitted from separate TRPs, and multiple NR-PDCCHs may each schedule a respective NR-PDSCH where each NR-PDSCH is transmitted from a separate TRP.

The channel quality differences among the multiple layers of a given codeword in NR networks may be large or small depending on several factors. For example, when different layers of the given codeword are transmitted from different TRPs or panels (e.g., in non-coherent joint transmission), the layers may exhibit a large channel quality difference simply by virtue of the transmissions occurring from different devices or from different geographical locations. The use of accurate precoding in NR (e.g., singular value decomposition (SVD) precoding) in non-codebook-based MIMO also tends to create layers that exhibit a large quality differential. In contrast, the use of less accurate precoding, such as with codebook-based precoding and/or wideband precoding, tends to create layers that exhibit a smaller channel quality differential. The mere fact that NR supports more layers per codeword tends to create a large channel quality differential across layers. Additionally, channels that experience more frequency selective fading tend to create a larger channel quality differential across resource elements (REs).

With the use of accurate precoding (e.g., SVD precoding), the stronger layers tend to be less frequency selective in the channel quality, while the weaker layers tends to be more frequency selective in the channel quality. The strongest layers may have a relatively frequency-flat channel quality, while the weakest layers may exhibit more frequency selective fading in its channel quality. While the underlying channel may experience a large frequency selective fading, use of a rank 1 transmission with the strongest channel may result in a relatively frequency-flat channel. However, if a rank 4 transmission is selected, the channel is likely to show its frequency selectivity. When less accurate precoding (e.g., codebook-based or wideband precoding) is used, even use of the rank 1 transmission would result in the larger frequency selectively.

In order to achieve a given spectral efficiency, various combinations of modulation order-code rate pairs may be used. For example, a spectral efficiency of 1.5 bps/Hz may be achieved by either the combination of {quadrature phase shift-keying (QPSK), code rate R=¾} or {16-quadrature amplitude modulation (16QAM), code rate R=⅜}. However, depending on the degree of channel quality differential within the codeword, one MCS may be achieve better results over another. One of skill in the art would recognize that a lower code rate paired with a higher modulation order may provide better performance under a high spread in log likelihood ratio (LLR) quality. In other words, a lower modulation order (e.g., {QPSK, R=¾}) may be more beneficial for smaller frequency selectivity (smaller delay spread and/or a smaller localized RB allocation), a single TRP, less accurate precoding (e.g., codebook-based and/or wideband precoding), lower rank, while a lower code rate (e.g., {16QAM, R=⅜}) may be more beneficial for higher frequency selectivity (larger delay spread and/or wideband RB allocation), multiple TRP transmissions, accurate precoding (e.g., SVD precoding), and higher rank.

Figure 6:
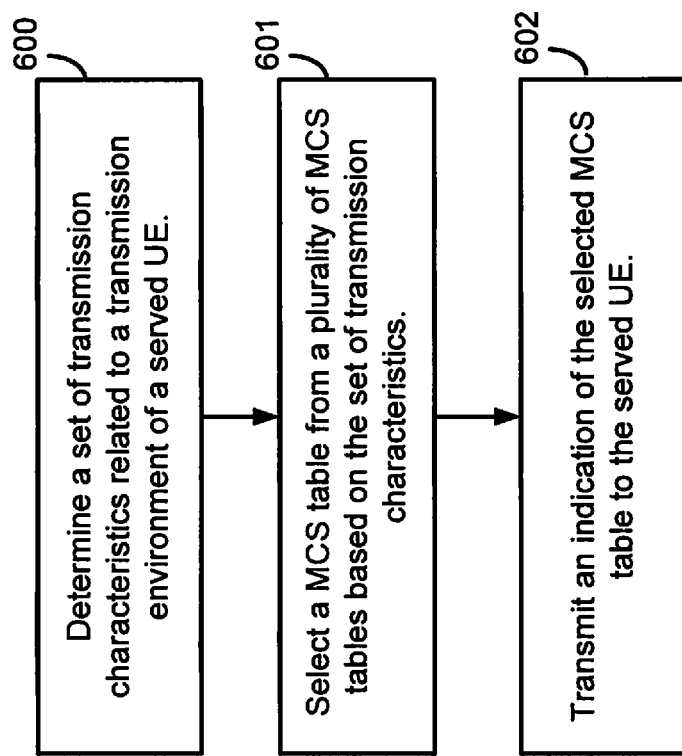
FIG. 6 is a block diagram illustrating example blocks executed to implement one aspect of the present disclosure.
Figure 8:
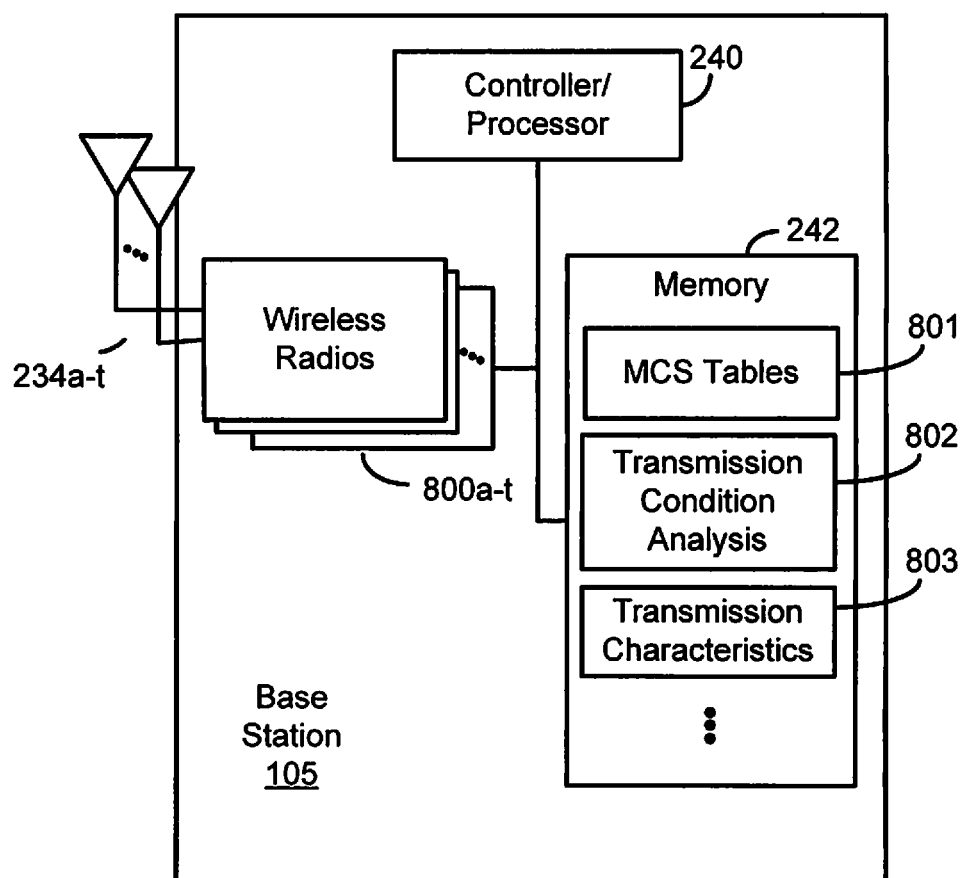
FIG. 8 is a block diagram illustrating a base station configured according to one aspect of the present disclosure.

FIG. 6 is a block diagram illustrating example blocks executed to implement one aspect of the present disclosure. The example blocks will also be described with respect to base station 105 as illustrated in FIG. 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800a-t and antennas 234a-t. Wireless radios 800a-t includes various components and hardware, as illustrated in FIG. 2 for base station 105, including modulator/demodulators 232a-t, MIMO detector 236, receive processor 238, transmit processor 220, and TX MIMO processor 230.

At block 600, a base station determines a set of transmission characteristics related to a transmission environment of a served UE. For example, base station 105, under control of controller/processor 240, executes transmission condition analysis logic 802, stored in memory 242. The execution environment of transmission condition analysis logic 802 allows base station 105 to determines the set of transmission characteristics 803 associated with the served UE. The set of transmission characteristics 803 may include multiple different characteristics that involve the transmission environment associated with the UE and affect the optimal choice of MCS, as noted previously. For example, transmission characteristics may include, but are not limited to, the level of frequency selective fading experienced by a given channel, the RB allocation (e.g., narrowband vs. wideband), deployment of the transmitter (e.g., one TRP or joint transmission from multiple TRPs or panels), transmission mode, rank, accuracy of precoding scheme (e.g, SVD precoding, codebook-based precoding, wideband precoding, open loop MIMO, etc.). Base station 105 stores transmission characteristics 803 in memory 242.

At block 601, the base station selects an MCS table from a plurality of MCS tables based on the set of transmission characteristics. For example, base station 105 maintains MCS tables 801 in memory 242. MCS tables 801 may also be known by the UE. Each MCS table in MCS tables 801 would include a set of MCS values that are selected to optimize or achieve higher performance with the transmission conditions associated with the characteristics of the set of transmission characteristics 803 determined by base station 105.

At block 602, the base station transmits an indication of the selected MCS table to the served UE. For example, base station 105 may transmit the indication semi-statically, such as via a broadcast signal or RRC signaling, or dynamically, such as via DCI, using wireless radios 800a-t and antennas 234a-t. In some aspects, one or more of the set of characteristics may trigger base station 105 to dynamically signal the indication of the selected MCS table. For example, base station 105 may be triggered to dynamically signal a selected MCS table based on the scheduled rank and/or RB allocation of the UE communications from transmission characteristics 803.

Figure 7:
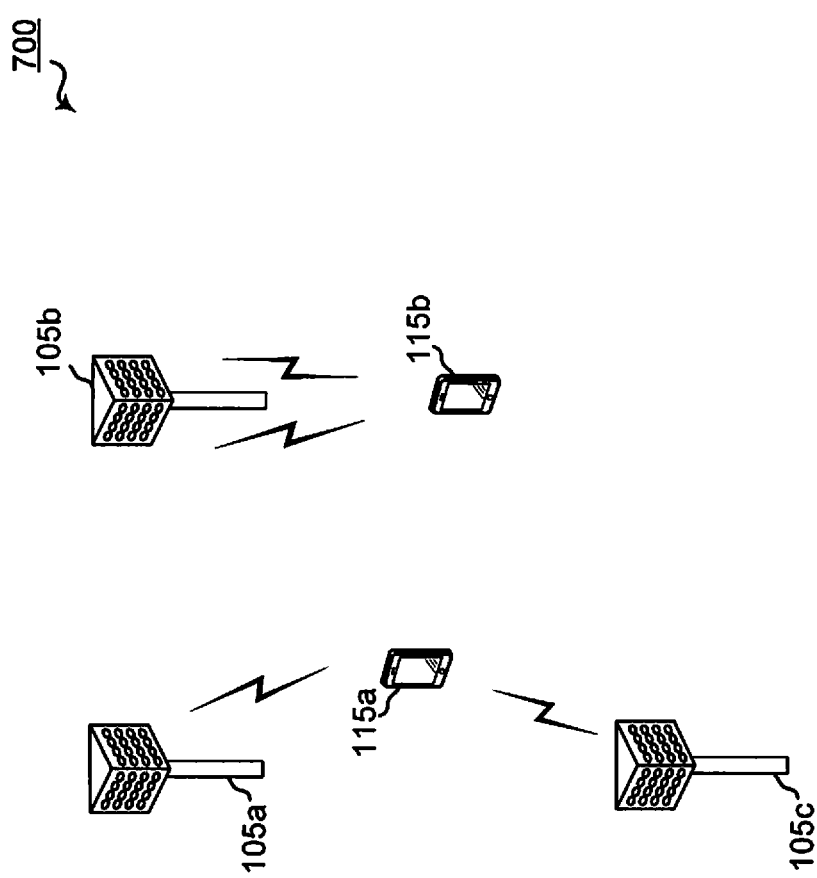
FIG. 7 is a block diagram illustrating an NR network including base stations configured according to aspects of the present disclosure.

FIG. 7 is a block diagram illustrating NR network 700 including base stations 105a-105c configured according to aspects of the present disclosure. Multiple MCS tables may be defined and maintained at each of base stations 105a-105c. In certain aspects, the multiple MCS tables may include multiple tables for uplink transmissions and multiple tables for downlink transmissions. When signaling the indication for the selected MCS table, base stations 105a-105c may signal a selected MCS table for uplink-only transmissions, for downlink-only transmissions, or for both uplink and downlink transmissions.

In operation, base stations 105a and 105c communicate with joint transmissions to UE 115a using SVD precoding. Base station 105b communicates with multi-panel transmissions to UE 115b. The communication from base station 105b uses a codebook based precoding scheme and rank 2. While both sets of communication include multiple layers per codeword that may experience a channel quality differential based on multi-TRP and multi-panel transmission, the communication between base station 105a and 105c also uses the more accurate precoding, which generally imparts greater channel quality differential, while the communication between base station 105b and 115b use less accurate precoding of a codebook-based precoding which generally imparts less of a channel quality differential. As base station 105a and 105b determine the set of transmission characteristics for UEs 115a and 115b, respectively, they would each select a different MCS table from the multiple MCS tables as the different channel quality differentials experienced at UEs 115a and 115b would have performance improved using different MCS values. Accordingly, the different sets of transmission characteristics experienced at either of UEs 115a and 115b of NR network 700 may be addressed using a more optimal set of MCS values in order to improve relative transmissions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, by a base station, a set of transmission characteristics related to a transmission environment of a served user equipment (UE), wherein the set of transmission characteristics includes a number of transmission reception points (TRPs) in communication with the served UE;
   selecting, by the base station, a modulation and coding scheme (MCS) table from a plurality of MCS tables based, at least in part, on the number of TRPs in communication with the served UE, wherein each of the plurality of MCS tables includes a set of MCS values selected for improved performance with transmission conditions associated with one or more characteristics of the set of transmission characteristics; and
   transmitting an indication of the selected MCS table to the served UE by the base station,
   wherein the plurality of MCS tables includes a plurality of MCS tables known to both the base station and the UE.

2. The method of claim 1, wherein the set of transmission characteristics further includes one or more of:
   a frequency selectivity of a channel of communication with the served UE;
   a resource block allocation for communication with the served UE;
   a transmission mode for communication with the served UE;
   a rank indicator for communication with the served UE; and
   a precoding scheme for communication with the served UE.

3. The method of claim 1, wherein the transmitting includes one of:
   semi-statically transmitting the indication to the served UE; or
   dynamically transmitting the indication to the served UE.

4. The method of claim 3, wherein the dynamically transmitting is in response to the determining of one or more of the set of transmission characteristics.

5. The method of claim 1, wherein the plurality of MCS tables includes:
- a plurality of uplink MCS tables for uplink communications; and
- a plurality of downlink MCS tables different from the plurality of uplink MCS tables for downlink communications.

6. The method of claim 1, wherein the transmitting includes one of:
- transmitting the indication of the selected MCS table for uplink-only communications from the served UE;
- transmitting the indication of the selected MCS table for downlink-only communication to the served UE; or
- transmitting the indication of the selected MCS table for uplink and downlink communications with the served UE.

7. An apparatus configured for wireless communication, comprising:
- means for determining, by a base station, a set of transmission characteristics related to a transmission environment of a served user equipment (UE), wherein the set of transmission characteristics includes a number of transmission/reception points (TRPs) in communication with the served UE;
- means for selecting, by the base station, a modulation and coding scheme (MCS) table from a plurality of MCS tables based, at least in part, on the number of TRPs in communication with the served UE, wherein each of the plurality of MCS tables includes a set of MCS values selected for improved performance with transmission conditions associated with one or more characteristics of the set of transmission characteristics; and
- means for transmitting an indication of the selected MCS table to the served UE by the base station,
- wherein the plurality of MCS tables includes a plurality of MCS tables known to both the base station and the UE.

8. The apparatus of claim 7, wherein the set of transmission characteristics further includes one or more of:
- a frequency selectivity of a channel of communication with the served UE;
- a resource block allocation for communication with the served UE;
- a transmission mode for communication with the served UE;
- a rank indicator for communication with the served UE; and
- a precoding scheme for communication with the served UE.

9. The apparatus of claim 7, wherein the means for transmitting includes one of:
- means for semi-statically transmitting the indication to the served UE; or
- means for dynamically transmitting the indication to the served UE.

10. The apparatus of claim 9, wherein the means for dynamically transmitting is in response to the means for determining of one or more of the set of transmission characteristics.

11. The apparatus of claim 7, wherein the plurality of MCS tables includes:
- a plurality of uplink MCS tables for uplink communications; and
- a plurality of downlink MCS tables different from the plurality of uplink MCS tables for downlink communications.

12. The apparatus of claim 7, wherein the means for transmitting includes one of:
- means for transmitting the indication of the selected MCS table for uplink-only communications from the served UE;
- means for transmitting the indication of the selected MCS table for downlink-only communication to the served UE; or
- means for transmitting the indication of the selected MCS table for uplink and downlink communications with the served UE.

13. A non-transitory computer-readable medium having program code recorded thereon, the program code comprising:
- program code executable by a computer for causing the computer to determine, by a base station, a set of transmission characteristics related to a transmission environment of a served user equipment (UE), wherein the set of transmission characteristics includes a number of transmission/reception points (TRPs) in communication with the served UE;
- program code executable by the computer for causing the computer to select, by the base station, a modulation and coding scheme (MCS) table from a plurality of MCS tables based, at least in part, on the number of TRPs in communication with the served UE, wherein each of the plurality of MCS tables includes a set of MCS values selected for improved performance with transmission conditions associated with one or more characteristics of the set of transmission characteristics; and
- program code executable by the computer for causing the computer to transmit an indication of the selected MCS table to the served UE by the base station,
- wherein the plurality of MCS tables includes a plurality of MCS tables known to both the base station and the UE.

14. The non-transitory computer-readable medium of claim 13, wherein the set of transmission characteristics further includes one or more of:
- a frequency selectivity of a channel of communication with the served UE;
- a resource block allocation for communication with the served UE;
- a transmission mode for communication with the served UE;
- a rank indicator for communication with the served UE; and
- a precoding scheme for communication with the served UE.

15. The non-transitory computer-readable medium of claim 13, wherein the program code executable by the computer for causing the computer to transmit includes one of:
- program code executable by the computer for causing the computer to semi-statically transmit the indication to the served UE; or
- program code executable by the computer for causing the computer to dynamically transmit the indication to the served UE.

16. The non-transitory computer-readable medium of claim 15, wherein the program code executable by the computer for causing the computer to dynamically transmit is in response to execution of the program code executable by the computer for causing the computer to determine of one or more of the set of transmission characteristics.

17. The non-transitory computer-readable medium of claim 13, wherein the plurality of MCS tables includes:
 a plurality of uplink MCS tables for uplink communications; and
 a plurality of downlink MCS tables different from the plurality of uplink MCS tables for downlink communications.

18. The non-transitory computer-readable medium of claim 13, wherein the program code executable by the computer for causing the computer to transmit includes one of:
 program code executable by the computer for causing the computer to transmit the indication of the selected MCS table for uplink-only communications from the served UE;
 program code executable by the computer for causing the computer to transmit the indication of the selected MCS table for downlink-only communication to the served UE; or
 program code executable by the computer for causing the computer to transmit the indication of the selected MCS table for uplink and downlink communications with the served UE.

19. An apparatus configured for wireless communication, the apparatus comprising:
 at least one processor; and
 a memory coupled to the at least one processor,
 wherein the at least one processor is configured:
  to determine, by a base station, a set of transmission characteristics related to a transmission environment of a served user equipment (UE), wherein the set of transmission characteristics includes a number of transmission/reception points (TRPs) in communication with the served UE;
  to select, by the base station, a modulation and coding scheme (MCS) table from a plurality of MCS tables based, at least in part, on the number of TRPs in communication with the served UE, wherein each of the plurality of MCS tables includes a set of MCS values selected for improved performance with transmission conditions associated with one or more characteristics of the set of transmission characteristics; and
  to transmit an indication of the selected MCS table to the served UE by the base station,
 wherein the plurality of MCS tables includes a plurality of MCS tables known to both the base station and the UE.

20. The apparatus of claim 19, wherein the set of transmission characteristics further includes one or more of:
 a frequency selectivity of a channel of communication with the served UE;
 a resource block allocation for communication with the served UE;
 a transmission mode for communication with the served UE;
 a rank indicator for communication with the served UE; and
 a precoding scheme for communication with the served UE.

21. The apparatus of claim 19, wherein the configuration of the at least one processor to transmit includes configuration of the at least one processor to one of:
 semi-statically transmit the indication to the served UE; or
 dynamically transmit the indication to the served UE.

22. The apparatus of claim 21, wherein the configuration of the at least one processor to dynamically transmit is in response to execution of the configuration of the at least one processor to determine of one or more of the set of transmission characteristics.

23. The apparatus of claim 19, wherein the plurality of MCS tables includes:
 a plurality of uplink MCS tables for uplink communications; and
 a plurality of downlink MCS tables different from the plurality of uplink MCS tables for downlink communications.

24. The apparatus of claim 19, wherein the configuration of the at least one processor to transmit includes configuration of the at least one processor to one of:
 transmit the indication of the selected MCS table for uplink-only communications from the served UE;
 transmit the indication of the selected MCS table for downlink-only communication to the served UE; or
 transmit the indication of the selected MCS table for uplink and downlink communications with the served UE.

* * * * *